Oct. 13, 1964    G. HUCHLER    3,152,382
METHOD OF PRODUCING FELT ARTICLES
Filed June 18, 1958

Inventor
Georg Huchler
By Richard Churf
     ag't 3,152,382
METHOD OF PRODUCING FELT ARTICLES
Georg Huchler, Birkendorferstrasse 55, Biberach
an der Riss, Germany
Filed June 18, 1958, Ser. No. 742,930
Claims priority, application Germany June 21, 1957
1 Claim. (Cl. 28—72.3)

The present invention relates to felt articles made of a feltable flat fibrous material, and to a method of producing the same. The invention is particularly concerned with the production of hollow felt articles of any kind, such as, for example, hats, funnels, filters, tubes, footwear, and the like. Such articles have so far usually been produced by being cut or stamped out of a flat piece or bat of felt, and by then sewing, gluing or nailing the cuts together, with the result that at the points of the seams the felt formed a double layer and the overlapping portions were not structurally combined with each other.

In order to avoid structural separations within the finished felt article, it has been proposed to form a tapered body of a fibrous raw material and then to work this body into the desired shape and size by plucking and pulling it during the fulling or felting treatment. Such operation not only changes and weakens the structure of the material, but it also causes the thickness of the felt layer to become uneven. This reduces the quality of the product and often requires additional material to be subsequently applied to and felted upon the product. The respective edges of the flat material are then combined with each other by being superimposed upon each other and by felting the overlapping layers to each other. This requires not only a difficult edging treatment, but due to unavoidable slipping of the thin outer edgings it also results in structural irregularities at the points of connection of the felt body. Unsymmetrical shapes as required, for example, in hats and footwear, if attainable at all, can hardly ever be attained without any defect by any of the known methods.

Accordingly, it is an object of the present invention to provide a felt article which is made of a flat bat of feltable fibers and is formed by combining the edges of such material merely by felting them to each other and by carrying this out in a single felting process by felting the entire material which previously has only been prefelted.

A further object of the present invention is to provide a felt article, the edge portions of which are combined to form the article merely by felting together the abutting edges of the material and without overlapping them.

In a felt article of this type, the fibers of all parts interlock with each other and the article itself is of a uniform structure throughout, and retains its shape and size to a far greater extent than similar articles made according to prior methods. Whereas, in these prior methods the edges of adjacent flat portions had to be combined with each other by superimposing them upon each other and then squeezing the fibers in one direction of pressure or the other, the edge portions are now placed side by side and the fibers in each portion are felted to each other to form a single unit by moving them in a direction transverse to the direction of pressure. Thus, the attention which previously had to be given to an adequate overlapping of the edge portions while the felt article was being shaped is also no longer required.

The method according to the invention of producing shaped hollow felt articles consists in first shaping a feltable flat material into a hollow body, the dimensions of which exactly correspond in proportion to those of the final article, taking into account the shrinking of the fibrous material during the following felting treatment to which this unfinished body is then subjected. After attaining the desired degree of shrinkage, the usual fine-felting or planking and drying may be carried out on the block.

Such a method entirely avoids any change in the structure of the material. Since the important shaping treatments are carried out prior to the felting or fulling of the material, and since the felt material can thus be subjected to the felting action and be shrunk without any interference, a product will be attained which has a uniform structure throughout, as well as a wall strength of an even thickness. This permits a normal shaping operation and results in a felt article without any seam.

Since the size and shape of the final product is already predetermined in the course of production of the preliminary hollow body from the flat raw fibrous material by the proportionate shape and dimensions thereof, no additional complicated shaping operations will be required to attain such final product, and it is merely necessary to carry out the shrinking process to the extent as required by the desired size of the article.

The preliminary hollow felt product which is formed prior to the felting operation also does not need to be a closed body. The edges which are to be combined are placed so as to abut bluntly against each other and are then retained in such a position. During the felting treatment they are felted together by the movement of the fibers in a direction transverse to the pressing direction and thus interlock with each other so as to form a homogeneous connection which is of the same structure and thickness as the other parts of the product. For producing the preliminary felt body, flat precut pieces may be used. Thus, for example, for producing an unsymmetrical hollow body, such as a shoe or a hat, according to a stencil which is made in dimensions proportionate to the amount of shrinkage and those of the final size and shape of the desired article, a feltable flat material, for example, a prefelted pile layer of animal hair with or without an addition of other textile fibers, such as staple fibers, cotton, synthetic fibers, is prepared in the usual manner and cut off sharply along the stencil without leaving any projecting edge portions, which previously were required for overlapping each other when the preliminary body was fitted together of its individual parts. In the subsequent felting treatment, the preliminary body thus assembled, the individual parts of which abut against each other bluntly and only require to be connected to each other initially, will be shrunk to the final desired dimensions, whereupon it is drawn over the block, fine-felted or fulled, and dried. In accordance with the block used, it may also assume any unsymmetrical shape, such as that of a shoe or a fashionable hat, and will retain such shape because of its natural and uniform felt structure at all parts of the final product and because of the accurate proportionate dimensions of the preliminary product.

The flat pieces of the feltable material which are properly prepared and cut and fitted against each other to form the preliminary product may be held together by threads which are sewed in a zigzag formation. Such a zigzag seam will in this case only form a temporary connection since during the felting treatment, the abutting edge portions will also shrink so that the threads of the zigzag seam will bellow and loosen, and will no longer have to stand any tensile stresses. They will then practically act like any other fiber of the fibrous material. If desired, these threads may also be removed from the final product.

The bluntly abutting edges of the flat feltable material may also be temporarily held together simply by suitable clamps or even by hand, since the abutting edges will adhere to each other after a short felting treatment and do not require any special securing means.

These objects, features, and advantages of the present invention will also appear from the following detailed description of several embodiments thereof, as illustrated, for example, in the accompanying drawings, in which—

FIGURE 3 shows a cross section of adjacent edge portions of the preliminary product according to FIGURE 1 placed in an abutting relationship to each other; while

Figure 1:
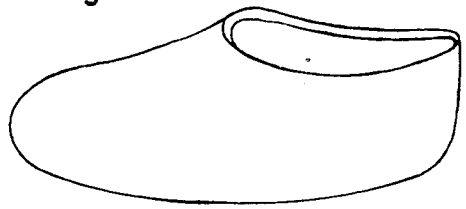
FIGURE 1 shows a perspective view of the preliminary product according to the invention made of a flat bat of feltable fibers.
Figure 2:
FIGURE 2 shows the final felt product.

Referring to the drawings, the preliminary product, as shown in FIGURE 1, is made of a shape and in dimensions which are exactly in proportion to those of the final product, as illustrated in FIGURE 2. While in the preliminary product the individual fibers lie loosely and only in a slightly interlocking relationship with each other so that the body will not of itself retain its shape, the individual fibers of the final product as shown in FIGURE 2, while still retaining their original interengagement, are more closely combined and in a multiple interlocking engagement with each other, so that the felt body thus formed will, when dried, also retain its shape. The proportionally similar preliminary product is converted into a final product of the desired size and shape by a natural compression of the material.

Figure 3:
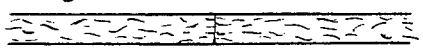
Figure 4:
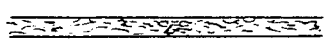
FIGURE 4 shows the same edge portions in the final article according to FIGURE 2.

The loose bedding of the fibers, as illustrated in FIGURE 3, permits them to penetrate into each other and to felt together tightly at the abutting edge portions which are fitted closely against each other. This results in an intimate and solid connection of the fibers at all points of these former edge portions so that the latter can hardly be distinguished from the other parts of the material of the final product.

The final product of whatever size or shape it may be may then be subjected to any desired additional treatment, either chemical or mechanical, for example, by decatizing, stiffening, or sizing, dressing, pouncing, embossing, perforating, sueding, trimming, printing, embroidering, etc.

For the production of shoes it is important that the felt article as produced according to the invention in the shape of a shoe already forms a self-sustaining body of the desired shape which may be provided without difficulty and in a known manner with a sole or a sole assembly.

Due to the accuracy of the size and shape of the final felt product which is attained by being predetermined in the preliminary product, it is possible to manufacture, for example, seamless inner shoes, the outer dimensions of which correspond exactly to the internal dimensions of the outer shoes of rubber, leather, plastic, wood, and the like. It is thus possible in such combined footwear to avoid any formation of folds and creases, as well as other difficulties which previously occurred when felt layers were used as an inner lining or insert of a shoe. Consequently, a comfortable wearing of such shoes may now be guaranteed under any conditions of use.

For attaining the desired shape of the felt article, the prefelted fabrous material may be layed upon and then be cut according to a block or last which conforms to the desired shape, but is of an enlarged scale differing from the dimensions of the final article by the amount of shrinkage occurring during the felting process. This cutting process may also be simplified by using a flat stencil or template which may be produced by molding a thin plastic sheet on such an enlarged block, last, or the like, by then cutting off such sheet according to such block or last, and by then flattening out such sheet, whereby the shape of the block, last, or the like will be spacially displaced, but all of the dimensions thereof will be retained therein. A flat stencil or template is then made according to the contours of this flattened sheet, and the flat piece of fibrous material is then placed upon such template and cut off.

Although such a stencil or template which contains the exact proportional dimensions of the final desired felt article as well as the shape thereof in a spacially displaced form may also be applied to great advantage in the conventional methods of producing hollow felt articles for example, those in which the overlapping edge portions of the flat piece of a merely prefelted material are felted together in a superimposed position, it is applicable particularly to the method according to the invention, in which the respective edges of the proportionally enlarged piece of material which are to be joined to produce the hollow article are placed in a bluntly abutting relation to each other, and are then felted to each other. Whereas in the first instance additional material for the overlapping edges has to be allowed for when the piece of fiberous material is cut off according to such template, it is possible according to the invention to cut the piece exactly according to the size and shape of the template. After felting together the abutting edges and shrinking the entire felt piece, the article will have the exact size and shape as desired, and the consistency and thickness thereof will be uniform at all points thereof.

The hollow felt article produced according to the invention may also be formed of a plurality of felt layers, for example, of layers of a different density of the fibers therein, of layers with fibers of different qualities, or of layers of a different color and appearance.

Although my invention has been illustrated and described with reference to the preferred embodiments thereof, I wish to have it understood that it is in no way limited to the details of such embodiments, but is capable of numerous modifications within the scope of the appended claim.

Having thus fully disclosed my invention, what I claim is:

A method of producing a hollow felt article comprising
(1) cutting a blank of prefelted fibrous sheet material so as to correspond in size and shape, in a proportionally dimensional relation, to size and shape of said hollow article in flattened condition,
(2) carrying out said cutting at substantially right angles, thereby producing end faces extending substantially rectangularly, with respect to the extent of said sheet material,
(3) abutting said end faces against each other without any overlapping, and thus forming a preliminary hollow body, and
(4) subjecting said preliminary body to a felting treatment, thereby felting said abutting end faces together and shrinking said preliminary body to the size and shape of the finished hollow article, the size and shape of said cut blank being determined by the amount of shrinkage to which said preliminary hollow body is subjected during felting.

References Cited in the file of this patent

UNITED STATES PATENTS

| | | |
|---|---|---|
| 9,557 | Perkins | Jan. 25, 1853 |
| 18,487 | Gitchell et al. | Oct. 20, 1857 |
| 1,062,877 | Bogani et al. | May 27, 1913 |
| 2,270,223 | Schlock | Jan. 13, 1942 |
| 2,441,390 | Boeddinghaus | May 11, 1948 |
| 2,472,263 | Pasko | June 7, 1949 |
| 2,774,126 | Secrist | Dec. 18, 1956 |
| 2,774,128 | Secrist | Dec. 18, 1956 |

FOREIGN PATENTS

| | | |
|---|---|---|
| 13,761 | Great Britain | 1887 |
| 511,821 | Great Britain | Aug. 24, 1939 |
| 563,211 | Great Britain | Aug. 3, 1944 |
| 623,495 | Great Britain | May 18, 1949 |